Nov. 18, 1941.    R. HUTCHINSON ET AL    2,263,500
MACHINE FOR PRODUCING A FRICTION ELEMENT
Filed Feb. 24, 1941    8 Sheets-Sheet 1

Nov. 18, 1941.   R. HUTCHINSON ET AL   2,263,500
MACHINE FOR PRODUCING A FRICTION ELEMENT
Filed Feb. 24, 1941   8 Sheets-Sheet 4

Nov. 18, 1941.   R. HUTCHINSON ET AL   2,263,500
MACHINE FOR PRODUCING A FRICTION ELEMENT
Filed Feb. 24, 1941   8 Sheets-Sheet 5

Inventors:
Russell Hutchinson
Carl F. Ogren
Arthur H. Durage
by their Attorneys
Howson & Howson Nov. 18, 1941.  R. HUTCHINSON ET AL  2,263,500
MACHINE FOR PRODUCING A FRICTION ELEMENT
Filed Feb. 24, 1941  8 Sheets-Sheet 8

Inventors:
Russell Hutchinson
Carl F. Ogren
Arthur H. Durage
by their Attorneys
Howson & Howson Patented Nov. 18, 1941

2,263,500

UNITED STATES PATENT OFFICE 2,263,500

MACHINE FOR PRODUCING A FRICTION ELEMENT

Russell Hutchinson, Hamilton Township, Mercer County, N. J., Carl F. Ogren, Lower Makefield Township, Bucks County, Pa., and Arthur H. Durage, Burbank, Calif., assignors to Thermoid Company, Trenton, N. J., a corporation of Delaware Application February 24, 1941, Serial No. 380,346

16 Claims. (Cl. 242—1)

The principal object of this invention is to provide a friction facing of improved structural form and physical characteristics.

Another object of the invention is to provide a machine and method for manufacturing friction facings of the generally improved form hereinafter described.

It has been proposed to produce facings, such for example as those used in friction clutches, by winding one or more strands, preferably pretreated with suitable frictioning materials, into the form of a helically-wound body, and to thereafter condense the body by pressure to the approximate dimensions of the desired facing. These cord-wound facings possess certain material advantages, but as heretofore produced have displayed certain undesirable characteristics, such for example as lack of strength in the transverse directions due to the laminated effect of the superimposed helical windings, and a tendency to exhibit on the operating faces relatively hard lines or ridges corresponding to the convolutions of the windings. In accordance with the present invention, friction facings may be produced which, while embodying the several material advantages of facings of the cord-wound type, are substantially lacking in the aforesaid disadvantages. In a friction facing made in accordance with the invention, the laminated effect is entirely avoided, with the result that the facing displays uniformly great strength in all directions. Furthermore, the convolutions of the cord or cords of which the body of the facing is composed are arranged so as to avoid the circular striated effect, which has been an objection in the prior facings of this type. At the same time, a facing made in accordance with the invention displays a high degree of structural homogeneity.

With reference to Figs. 1 to 9, inclusive, of the drawings, the machine therein disclosed comprises essentially a rotary form 1 having an annular recess 2 which receives the cord or cords 3 of which the friction facing is to be formed. Operating in conjunction with the rotary form is a guide finger 4 having an eyelet 5 through which the cord 3 passes, and means is provided for traversing the finger 4 radially with respect to the recess 2 and in timed relation with the rotation of the form 1 so as to lay the cord in the recess 2 in a predetermined pattern corresponding for example to that disclosed in Figs. 4 and 8. Cooperating with the guide finger 4 in the development of this pattern are a plurality of pins or spikes 6 which project upwardly from the bottom of the recess 2, and these pins function also at the beginning of the winding operation to snag the leading end of the cord 3 whereby the cord is drawn into the recess 2 by the rotation of the form.

Figures 4, 5:
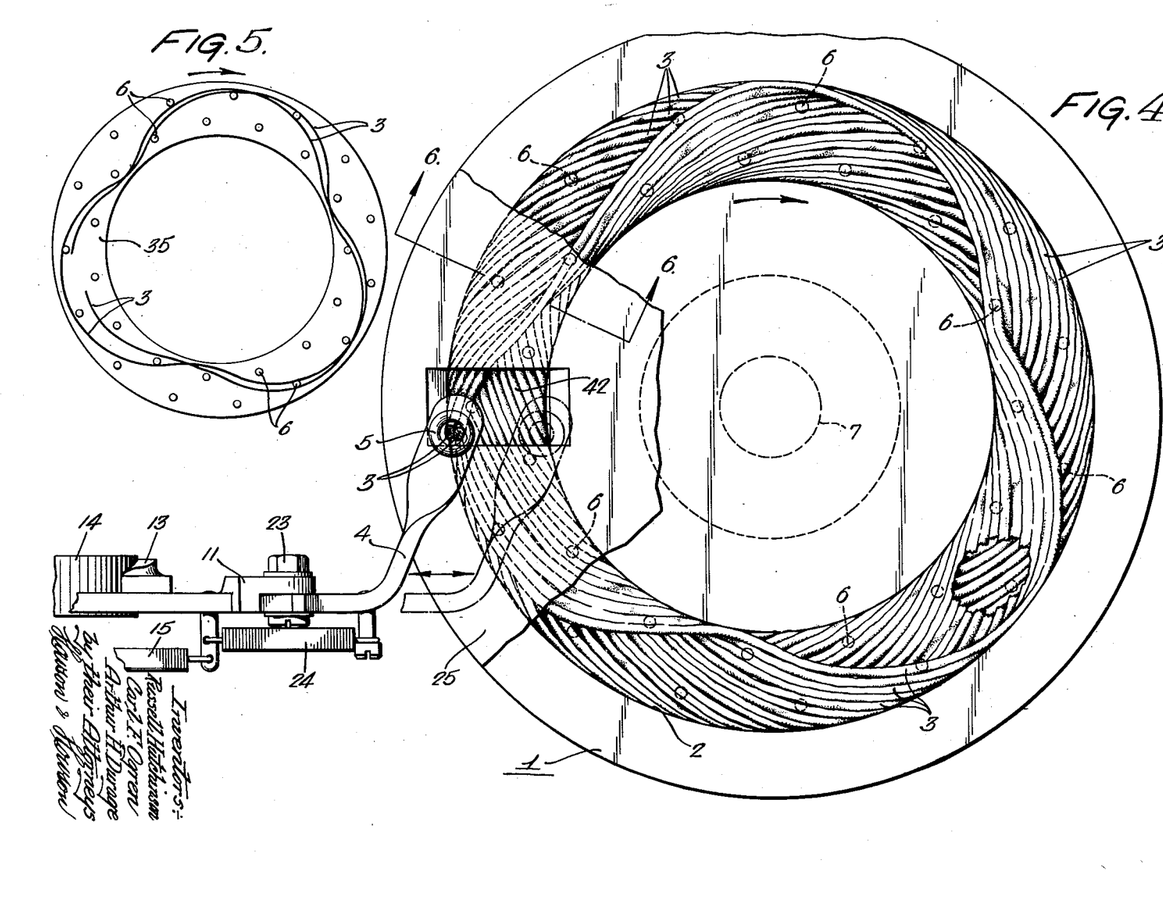
Fig. 4 is a fragmentary plan view showing certain elements of the machine and the manner in which the cords are fed to the latter.
Fig. 5 is a diagrammatic plan view illustrating the manner in which the cords are assembled in the machine to produce the friction facing.

Referring to Figs. 4 and 5, one of the essential characteristics of the pattern produced by the cords when fed to the recess 2 as described above resides in the fact that in each convolution the cord extends throughout the major portion of the convolution transversely to a circular line concentric with the axis of the form, that is to say, the cord in each convolution, instead of being substantially concentric with the geometrical center of the form, extends transversely across the radial width of the wound body, but angularly with respect to radial lines. The particular pattern shown in Fig. 4 is produced by giving the guide finger 4 slightly less than three full reciprocations for each rotation of the form 1. In each revolution of the form, therefore, the finger 4 traverses the recess 2 approximately six times, so that in each convolution the cord follows a waved course, as best illustrated in Fig. 5, between the inner and outer peripheries of the said recess with three points of theoretical contact with each of said peripheries. By reason of the slight departure from the ratio of one to three between the rotations of the form and the reciprocations of the finger, the successive convolutions do not directly overlie but laterally adjoin each other, and the waved contours are thus made to progress in the circumferential direction, as clearly illustrated. As a result of this progression, a substantially uniform distribution of the cord and its convolutions in the recess 2 and in the wound body is obtained, so that the latter exhibits a high degree of structural homogeneity.

Another highly desirable structural feature resides in the fact, as illustrated in Fig. 4, that in the immediately adjoining layers the runs of the cord extend in angular or criss-crossed relation, which precludes stratification in the radial direction, and stratification in the axial direction is similarly avoided by circumferential progression of the waved contours of the successive convolutions, which results in the effective interspersion of the convolutions clearly illustrated in Fig. 4.

Figures 1, 3:
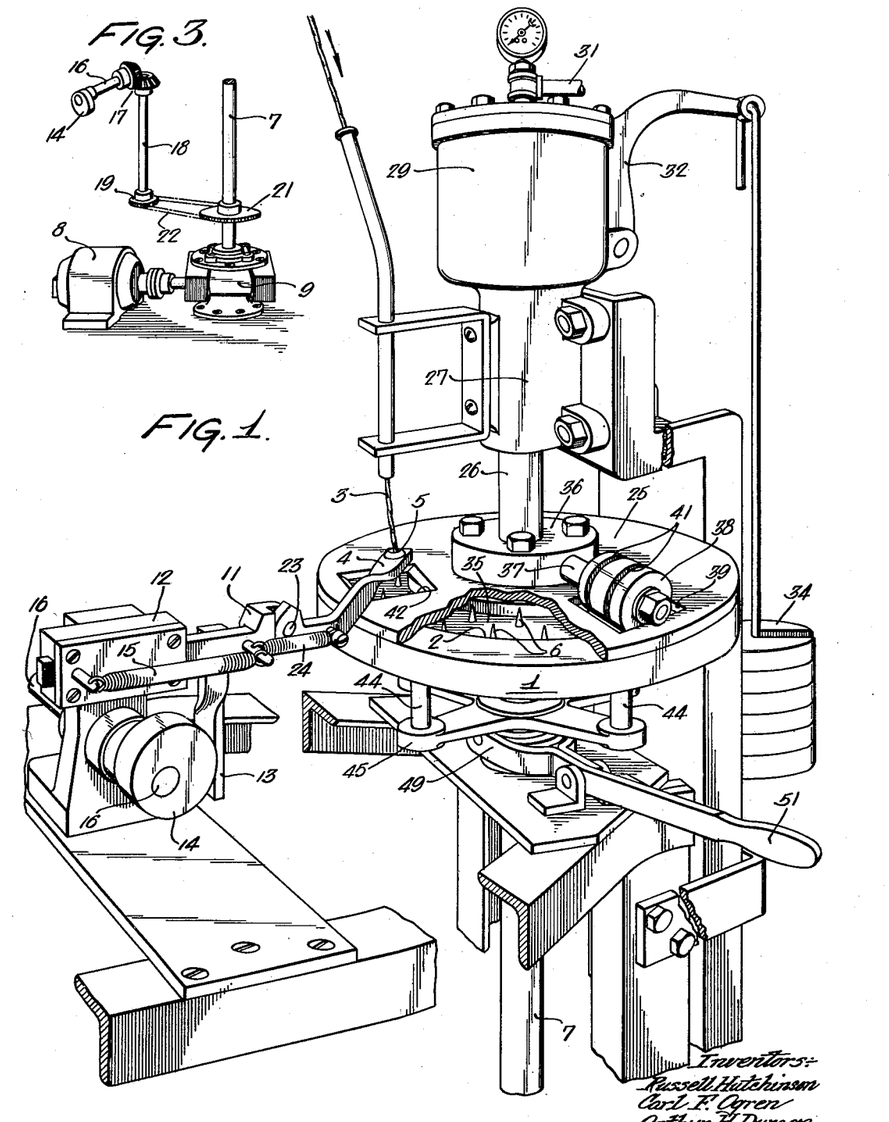
Figure 1 is a view in perspective of a machine for producing friction facings in accordance with the invention.
Fig. 3 is a more or less diagrammatic view in perspective illustrating certain details of the machine.

In the present instance, the form 1 is carried at the upper end of a vertical shaft 7, and as illustrated in Fig. 3, this shaft may be operated by a motor 8 through the medium of a suitable reduction gear 9. The finger 4 is carried on the end of a slide bar 11 which is mounted for longitudinal reciprocation in a suitable guide block 12. The bar 11 has a depending arm 13 which is held against the face of a rotary cam 14 by means, in the present instance, of a coiled spring 15. Rotation of the cam 14 in timed relation with the rotation of the shaft 7 may be effected by suitable transmission means, such, for example, as that shown in Fig. 3, wherein the cam shaft 16 is operatively connected with the shaft 7 through gears 17, shaft 18, sprockets 19 and 21 and sprocket chain 22. It will be noted by reference to Figs. 1 and 2 that the finger 4 is pivotally connected at 23 with the bar 11, and that the finger is held normally in the extended operative position by a spring 24. The pivotal connection permits the finger to be turned upwardly into the position illutrated in broken lines in Fig. 2 for a purpose hereinafter described.

Figure 2:
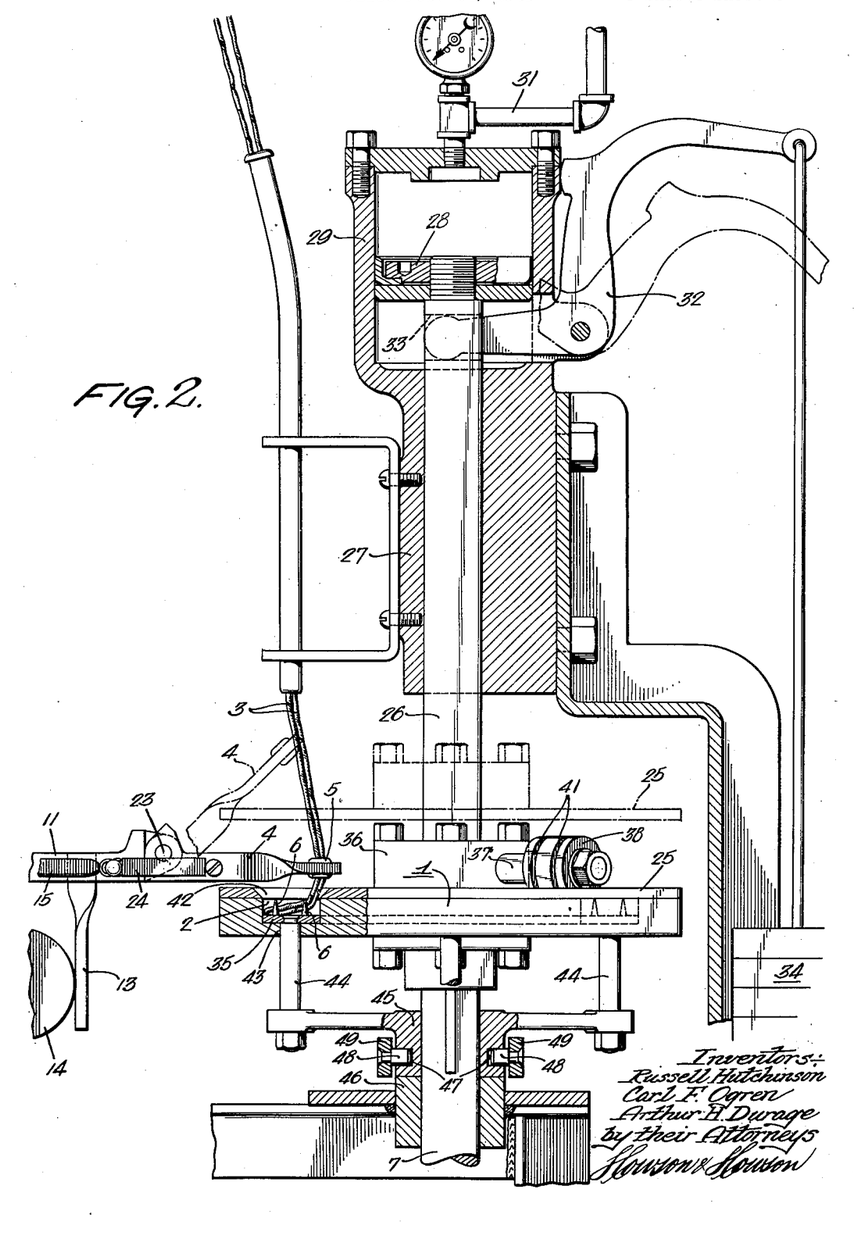
Fig. 2 is a vertical sectional view of the machine.

The form 1 is provided with a cover plate 25, this plate being carried at the lower end of a rod 26 which is slidably supported in the fixed structure 27 of the machine in alignment with the shaft 7. The upper end of the rod 26 carries a piston 28 which operates in a cylinder 29, and the upper end of this cylinder is connected through a suitable duct 31 with a source of fluid pressure (not shown). The rod 26 is normally supported in an elevated position through the medium of a pivoted bell crank lever 32, one arm of which engages in a slot 33 in the said rod, and the other arm of which is weighted, as indicated at 34. When the rod 26 is in the said elevated position, the cover plate 25 also occupies an elevated position, as indicated in broken lines in Fig. 2. When fluid pressure is applied to the top of the piston 28, the rod 26 is forced downwardly until the cover plate 25 seats solidly upon the upper face of the form 1, as shown in Figs. 1 and 2. It will be noted that when the cover plate 25 is elevated from the form as described above, the pivotal mounting of the finger 4 described above permits the cover plate to move the finger upwardly, as shown in broken lines, in Fig. 2.

Figure 6:
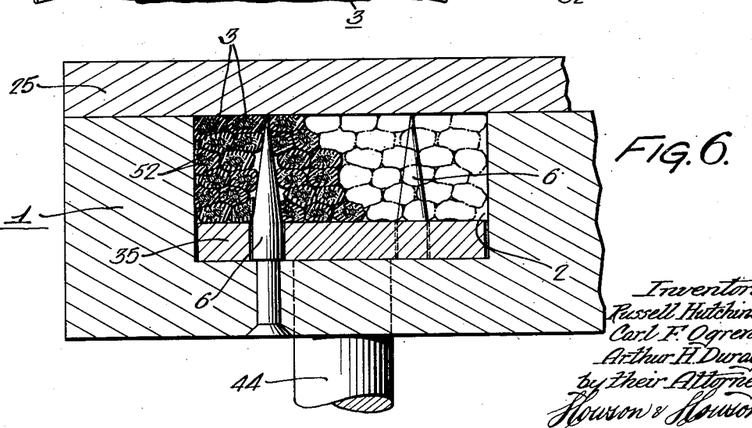
Fig. 6 is a section on the line 6—6, Fig. 4.

The pins 6 are secured in the form 1, as shown in Fig. 6, and an annular plate 35 normally seats in the bottom of the form recess 2, as illustrated in Figs. 2 and 6, and is provided with apertures through which the said pins project. The pins are of such height that the upper ends thereof lie flush or substantially flush with the under surface of the cover plate 25 when the latter is seated on the form. A flange 36 at the lower end of the piston rod 26, to which flange the cover plate 25 is attached, has projecting from one side thereof a stub shaft 37 which carries a roller 38, and this roller projects downwardly through an opening 39 in the cover plate and somewhat below the under surface of the said plate so as to enter the top of the recess 2. To provide clearance for the tips of the pins 6, the roller 38 is grooved as indicated at 41. During the winding operation, this roller engages the upper surface of the wound body in the recess 2, and prevents the cords from binding against the under surface of the cover plate. The cover plate is also provided with an opening 42 which affords access for the cord or cords 3 to the recess 2 of the form.

Depending from the plate 35 through apertures 43 in the bottom of the form 1 are a plurality of rods 44, the lower ends of which are secured to the arms of a spider 45. This spider is splined to the shaft 7 and is normally supported by a block 46 forming a part of the fixed structure of the machine. The hub of the spider is circumferentially recessed as shown at 47, see Fig. 2, and this recess receives trunnion pins 48, 48 on the forked end 49 of a pivoted lever 51. When the outer free end of this lever is depressed, see Fig. 1, the spider 45 is elevated, which results in a corresponding elevation of the plate 35 from the bottom of the recess 2. The plate, therefore, constitutes a means for stripping the cord-wound body from the pins 6 and the recess 2.

Figures 7, 8, 9:
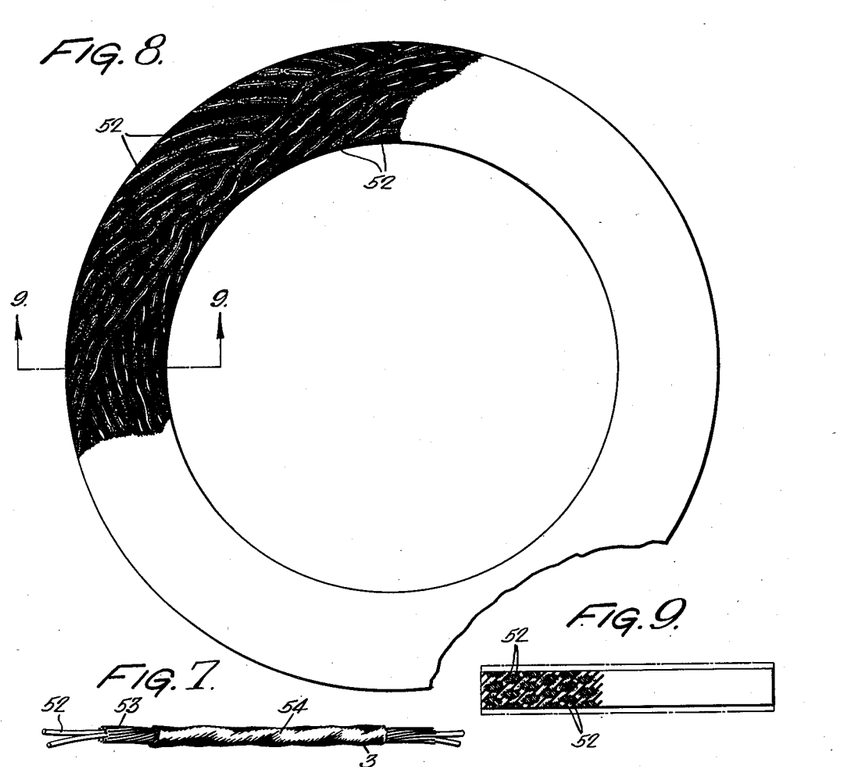
Fig. 7 is a view showing a fragment of a preferred form of friction-treated cord for use in the production of the friction element.
Fig. 8 is a face view of the finished product of the machine.
Fig. 9 is a sectional view on the line 9—9, Fig. 8.

After removal from the form 1, the cord-wound body produced as described above is subjected to heavy pressure, which compacts the convolutions of the cord and substantially reduces the original thickness of the wound body, as indicated in Fig. 9. Preferably the cords 3 are of the character shown in Fig. 7 consisting of one or more metallic wires intertwisted with or embraced by asbestos or other textile strands 53 and impregnated or coated with a suitable frictioning and bonding compound 54. This compound may be of the conventional type comprising rubber, synthetic resins or the like, either with or without suitable frictioning fillers. Application of heat during or subsequent to the compression operation causes a flowing and curing of the bonding material together with a uniform dissemination of the said material throughout the wound and compacted cord mass. Subsequently the faces of the bonded body may be ground or otherwise finished to the required texture. The resulting product is a structurally strong and substantially homogeneous friction facing of highly desirable characteristics.

Figure 11:
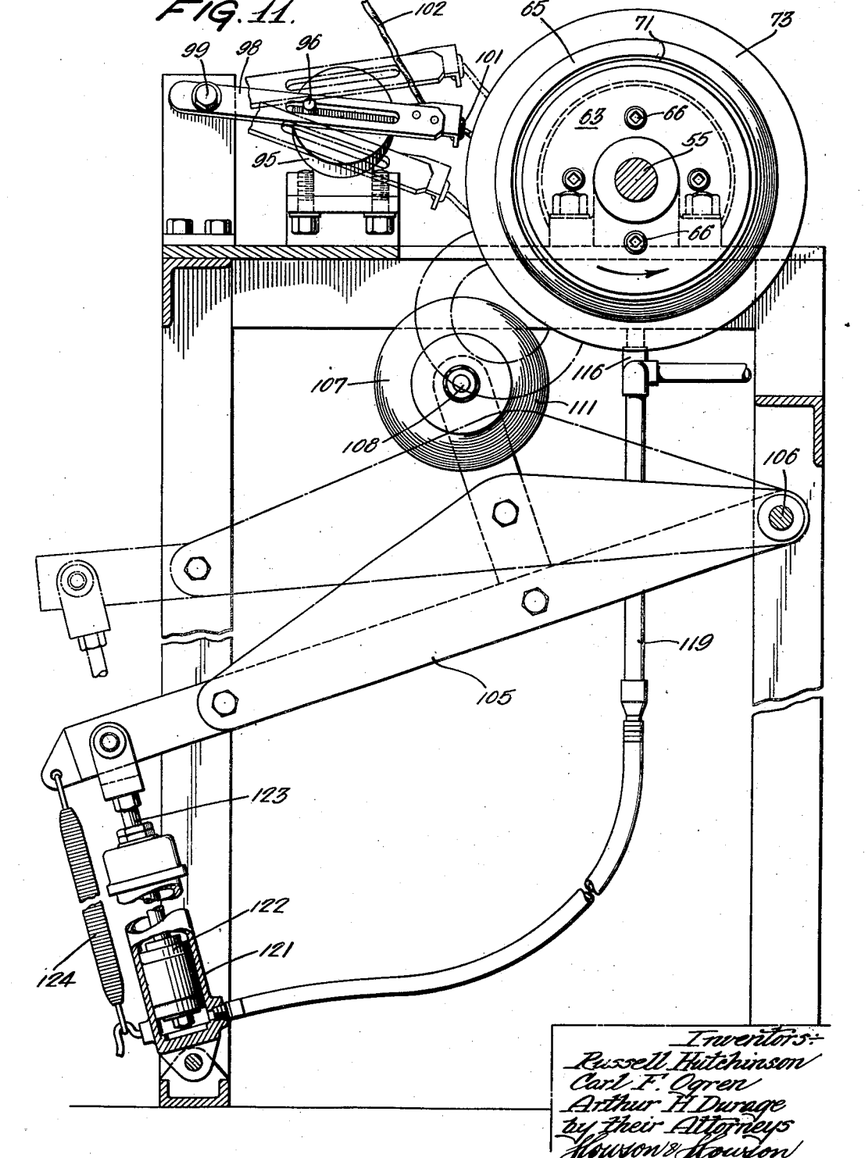
Fig. 11 is a section on the line 11—11, Fig. 10.
Figures 12, 15:
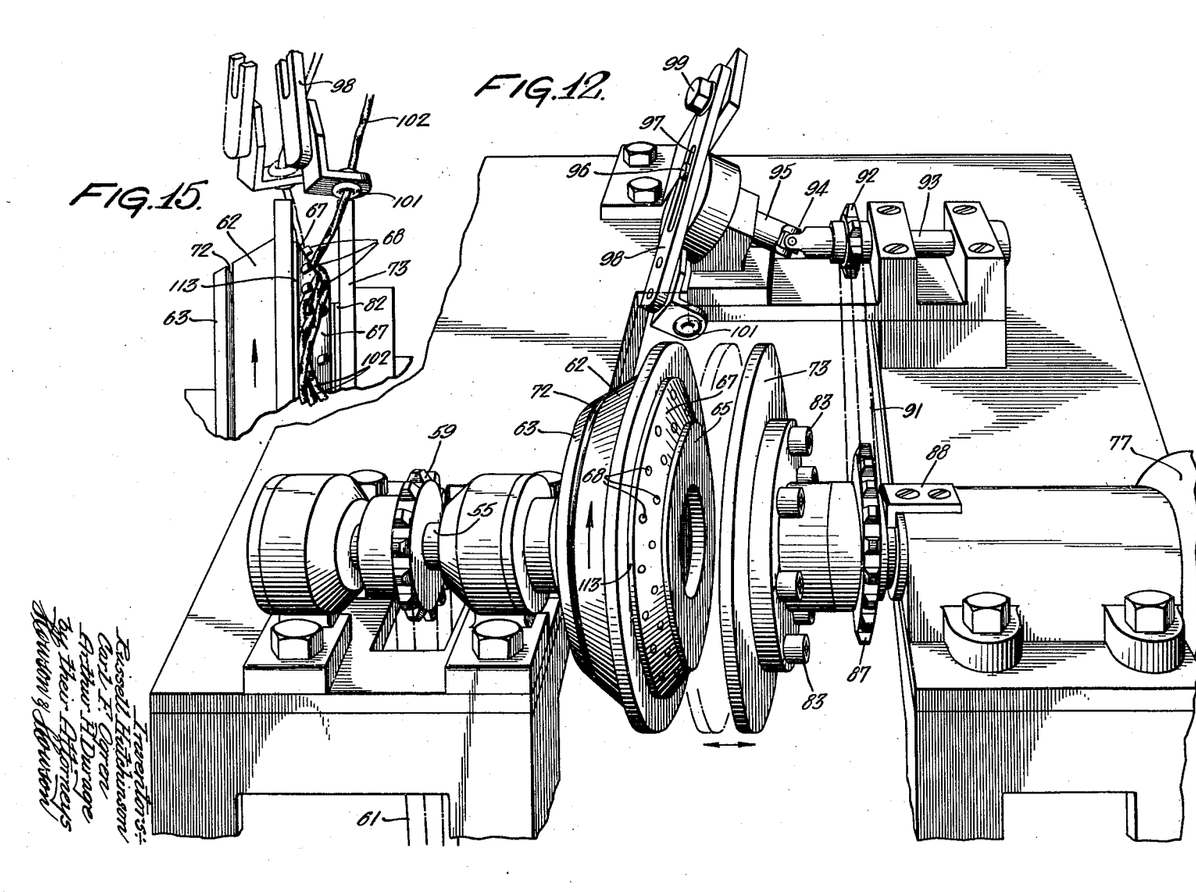
Fig. 12 is a view in perspective of the head portion of the machine shown in Figs. 10 and 11.
Fig. 15 is a fragmentary elevational view illustrating the manner in which the cord or cords are fed to the machine.
Figure 13:
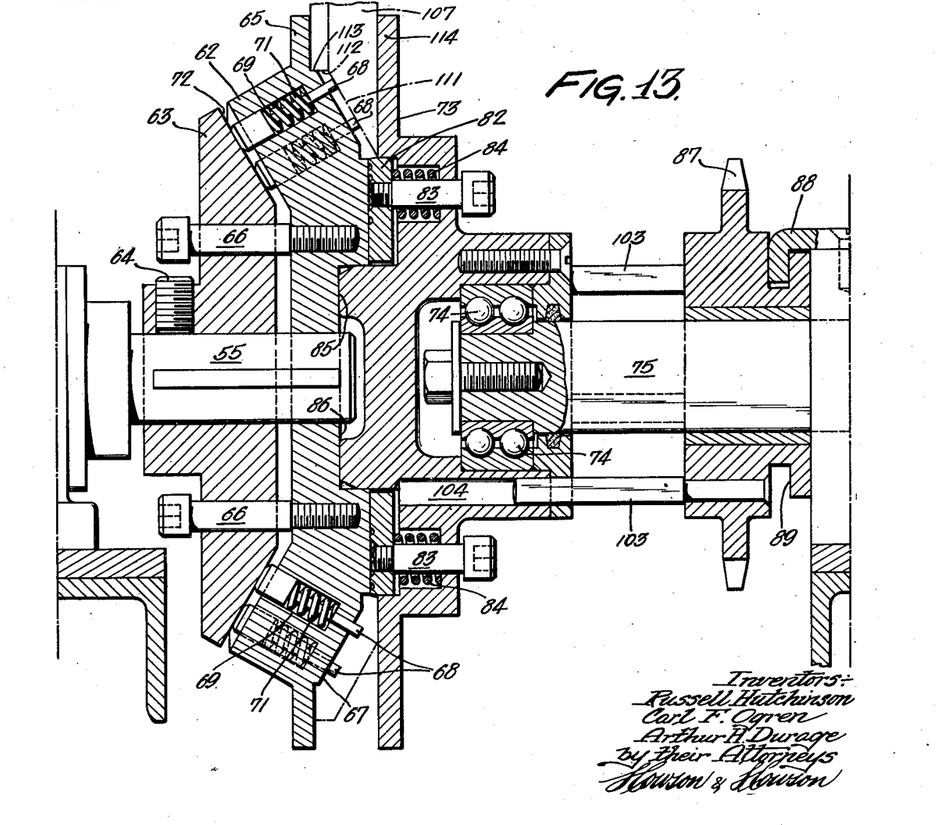
Fig. 13 is an enlarged fragmentary sectional view illustrating certain details of the machine shown in the immediately preceding figures.
Figure 14:
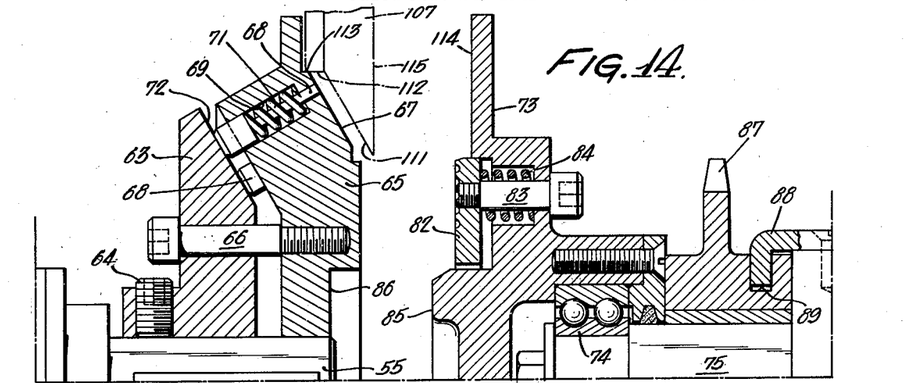
Fig. 14 is a fragmentary sectional view showing the elements of the machine illustrated in Fig. 13 in a different position of adjustment.
Figure 16:
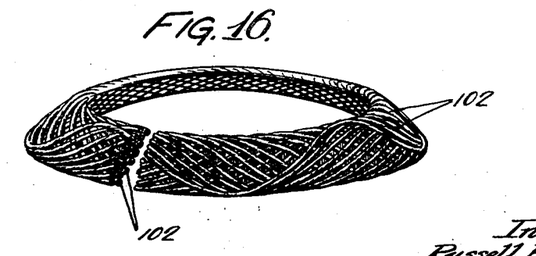
Fig. 16 is a view in perspective of the cord-wound body as formed in the machine illustrated in the immediately preceding figures.

The modified machine shown in Figs. 10 to 15, inclusive, comprises a shaft 55 which is driven from an electric motor 56 through the medium of a suitable reduction gear 57, sprockets 58 and 59, and sprocket chain 61. The shaft 55 carries a rotary head 62 consisting of a relatively fixed flange 63 which is secured to the shaft, in the present instance by a set screw 64 and a relatively movable flange 65 which is splined to the said shaft. The flanges 63 and 65 are connected through the medium of screws 66 which are threaded into the flange 65 and pass freely through openings in the flange 63, these screws being of sufficient length to provide for relative axial movement between the said flanges. The flange 65 is provided with a conical surface 67 upon which the cord is wound in forming the facing, and the said flange carries a plurality of pins 68 slidably mounted in cylindrical chambers 69, the reduced outer ends of which intersect the conical surface 67. The pins 68 are normally retracted by springs 71, as shown in Fig. 14, so that the outer ends of the pins do not project beyond the conical surface 67, and the inner enlarged ends of the pins normally bear against the beveled face 72 of the flange 63. When the flange 65 is moved axially towards the flange 63 by means hereinafter described, the pins 68 are caused to move relatively in the chambers 69 so that the outer ends thereof project beyond the conical surface 67, as shown in Fig. 13.

Figure 10:
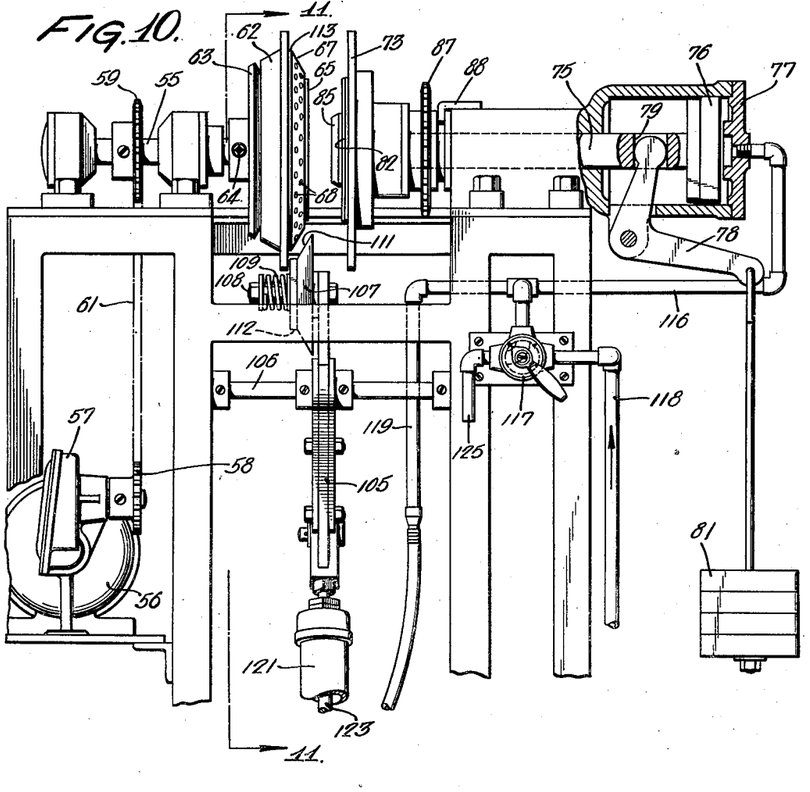
Fig. 10 is a front elevational and partial sectional view illustrating a modified form of machine adapted to produce friction facings in accordance with the invention.

Opposed to the rotary head 62 is a flange 73, this flange being journaled as at 74 on a rod 75 slidably supported in the fixed structure of the machine in alignment with the shaft 55. The opposite end of the rod 75 carries a piston 76 which operates in a cylinder 77. A pivoted bell crank lever 78 has one arm thereof engaged in a slotted opening 79 in the rod 75, and provision is made for weighting the other arm of the lever, as indicated at 81. The weight applied to the lever tends to retain the rod 75 and flange 73 in a retracted position, as shown in Fig. 10, wherein the piston 76 adjoins the outer end of the cylinder 77. Means is provided as hereinafter described for applying fluid pressure to the cylinder 77 to advance the piston 76 and the rod 75 so as to bring the flange 73 into operative engagement with the head 62.

The flange 73 carries at its forward face a disk 82, this disk being supported by screws 83 slidably mounted in the flange, and springs 84 associated with the respective screws 83 tend to retain the disk 82 in an advanced position, as shown in Fig. 14. When the flange 73 is advanced towards the rotary head 65, there is an initial engagement between the disk 82 and the face of the flange 65, see Fig. 13. Subsequently, the hub surface 85 of the flange 73 will be brought into solid abutment with the opposed surface 86 of the flange 65. By this engagement of the flange 73 with the flange 65, the latter flange is forced inwardly on the shaft 55 into the position shown in Fig. 13, wherein as previously described the ends of the pins 68 are projected beyond the conical face 67. It will be apparent that when the flanges 73 and 65 are interengaged as described above, the two flanges will rotate together as a unit.

Journaled on the shaft 75 is a sprocket 87, this sprocket being held against axial movement by a clip 88 which is attached to the fixed structure of the machine and which engages in a circumferential slot 89 in the hub of the sprocket. As shown in Fig. 12, the sprocket 87 is connected through a sprocket chain 91 with a sprocket 92 on a stub shaft 93. This shaft is connected through a flexible coupling 94 with a shaft 95 which is supported in axial misalignment with the shaft 93. The shaft 95 carries a crank pin 96 which fits into a longitudinal slot 97 in an arm 98 which is pivoted at 99 to the fixed structure of the machine. When the shaft 95 is rotated, the arm 98 is made to oscillate on the pivot 99, and the plane of oscillation is inclined to the plane of rotation of the flanges 73 and 65 whereby the outer free end of the arm 98 is made to traverse the space between the flange 73 and the conical face 67 of the flange 65. Secured to the said outer free end of the arm 98 is an eyelet 101, which as illustrated in Fig. 15 functions to guide the cord 102 to the conical surface 67 on which the cord-wound body of the friction disk is formed, as previously stated. The arm 98 and its eyelet 101 correspond, therefore, with the finger 4 and eyelet 5 of the previously described embodiment and function to the same end.

Referring again to Fig. 13, it will be noted that the sprocket 87 is operatively connected with the flange 73 by means of one or more rods 103 which extend from the hub of the sprocket into recesses 104 in the hub of the said flange, this arrangement being such as to provide for relative axial movement between the flange 73 and the sprocket. Rotation of the flange 73 is transmitted by the rod or rods 103 to the sprocket 87, and through the associated transmission mechanism to the arm 98. The arm 98 is thus caused to oscillate in timed relation with the rotation of the head 62.

Referring to Figs. 10 and 11, the machine further comprises a lever 105 which is pivotally mounted upon a rod 106 secured to the fixed structure of the machine. The lever 105 carries a beveled roller 107 which is journaled for rotation upon a pin 108 and which is slidable axially of said pin. A spring 109 tends to retain the roller 107 in the axial position shown in Fig. 10. When the lever is rocked upwardly by means hereinafter described, the roller 107 is caused to assume a position as shown in broken lines in Fig. 14, wherein the beveled face 111 of the roller lies opposite and in spaced relation to the conical surface 67 of the flange 62. A shoulder 112 on the roller 107 by engagement with an opposed shoulder 113 on the flange 62 limits the inward movement of the roller toward the axis of the rotary head 62, and establishes the positional relationship between the conical surface 67 of the said flange and the beveled face 111 of the roller. When the flange 73 is advanced into engagement with the flange 65 as previously described, the outer face 114 of the flange will engage the opposed face 115 of the roller 107, and will actually move the said roller against the pressure of the spring 109 so as to adjust the roller into the relative position shown in broken lines in Fig. 13. In this position of the roller, the beveled face 111 will be in engagement with or in close proximity to the outer projecting ends of the pins 68.

In operation, the parts of the machine are adjusted into the relative positions shown in Fig. 13, wherein as previously set forth rotation of the shaft 55 will effect a corresponding rotation of the head 62 and the flange 73 and an oscillation of the arm 98 in timed relation with this rotary movement. In order to start the formation of the convolutions, the end of the cord 102 is clamped between the spring-pressed element 82 and the opposed face of the flange 65. When the head 62 is rotated, the cord is thus drawn into the space between the flanges 73 and 65 and is guided onto the conical surface 67 by the traversing movements of the arm 98. As in the previously described embodiment, the oscillations of the arm 98 are timed with respect to the rotary movement of the head 62 and flange 73 so as to afford a form and relative disposition of convolutions corresponding in character to those described above whereby a cord-wound body is obtained having the same general characteristics as that previously described and differing therefrom only in the fact that the body, instead of taking the form of a flat annulus, is slightly coned in accordance with the angularity of the conical surface 67. After the body has been built up to the required thickness, the flange 73 is restricted from the flange 65 by release of fluid pressure from the cylinder 77 and the roller 107 withdrawn to the retracted position shown in Fig. 11. Withdrawal of the flange 73 relieves the pressure on the flange 65 and permits the springs 71, by reaction of the pins 68 against the beveled face 72 of the fixed flange 73, to advance the flange 65 axially with simultaneous retraction of the projecting ends of the pins 68 from the wound body. This body is then compressed in suitable die or press into the desired flat or coned form and finished in accordance with the procedure previously described.

With reference to Figs. 10 and 11, fluid pressure is applied to the cylinder 77 through a pipe 116 which is connected through a valve 117 with a supply pipe 118 connected with a suitable source of fluid energy (not shown). From the pipe 116 a branch pipe 119 extends to a pressure cylinder 121 which contains a piston 122, this piston being connected through a rod 123 with the outer free end of the lever 105. A spring 124 tends to retain the piston 122 in the retracted position, as shown in Fig. 11, in which position the lever 105 and the roller 107 are also retracted, the latter from its operative position with respect to the flanges 73 and 65. When fluid pressure is applied to the cylinder 121, the lever is actuated to advance the roller 107 into its operative position, as shown in Fig. 14. The valve 117 is a three-way valve which may be adjusted to admit pressure simultaneously to the pipes 116 and 119, or to release the pressure in said pipes through an exhaust pipe 125.

We claim:

1. In a winding machine, the combination with a rotary form having an annular strand-receiving channel, of means for directing a strand to said channel, said means including a strand-engaging guide element movable transversely of said channel so as to traverse the latter, means for operating said guide in timed relation with the rotary movement of said form, and means in said channel for positively positioning the strand within the form.

2. In a winding machine, the combination with a rotary form having an annular strand-receiving channel, of means for directing a strand to said channel, said means including a strand-engaging guide element movable transversely of said channel so as to traverse the latter, means for operating said guide in timed relation with the rotary movement of said form, and means in said channel for positively positioning the strand within the form, said positioning means comprising a plurality of pins projecting from the bottom wall of said channel.

3. In a winding machine, the combination with a rotary form having an annular strand-receiving channel, of means for directing a strand to said channel, said means including a strand-engaging guide element movable transversely of said channel so as to traverse the latter, means for operating said guide in timed relation with the rotary movement of said form, means in said channel for positively positioning the strand within the form, and a roller arranged in spaced relation to the bottom wall of said channel and operative to confine the said strand within the latter.

4. In a winding machine, the combination with a rotary form having an annular strand-receiving channel, of means for directing a strand to said channel, said means comprising a reciprocatory strand-engaging guide element movable so as to traverse said channel, means for actuating said guide element in timed relation with the rotary movement of said form whereby said element is made to traverse the channel a plurality of times during each complete rotation of the form, and means on said form for positively positioning the strand within the channel as said strand is guided to the channel by said element.

5. In a winding machine, the combination with a rotary form having an annular strand-receiving channel, of means for directing a strand to said channel, said means comprising a reciprocatory strand-engaging guide element movable so as to traverse said channel, means for actuating said guide element in timed relation with the rotary movement of said form whereby said element is made to traverse the channel a plurality of times during each complete rotation of the form, means on said form for positively positioning the strand within the channel as said strand is guided to the channel by said element, said positioning means comprising a plurality of pins projecting from the bottom wall of said channel; and means for stripping the mass of wound strand from said pins.

6. In a winding machine, the combination with a rotary form having a concentric annular strand-receiving channel, of a plurality of pins distributed over and projecting from the bottom of said channel, a plate forming a false bottom for said channel and having apertures for passage of the pins therethrough, a reciprocatory guide element movable in a path to traverse said channel and constituting a means for directing a strand to the latter, and means for shifting said false bottom so as to remove the wound mass of strand from the channel.

7. In a winding machine, the combination with a rotary form having a concentric annular strand-receiving channel, of a plurality of pins distributed over and projecting from the bottom of said channel, a plate forming a false bottom for said channel and having apertures for passage of the pins therethrough, a reciprocatory guide element movable in a path to traverse said channel and constituting a means for directing a strand to the latter, a cover-plate for said channel having an opening therethrough for passage of the strand to the channel, said cover-plate being retractible to provide for ejection of the wound mass of strand from the channel, and means for shifting the said false bottom so as to eject said wound mass.

8. In a winding machine, the combination with a rotary form having a concentric annular strand-receiving channel, of a plurality of pins distributed over and projecting from the bottom of said channel, a plate forming a false bottom for said channel and having apertures for passage of the pins therethrough, a reciprocatory guide element movable in a path to traverse said channel and constituting a means for directing a strand to the latter, a cover-plate for said channel having an opening therethrough for passage of the strand to the channel, said cover-plate being retractible to provide for ejection of the wound mass of strand from the channel, means for shifting the said false bottom so as to eject said wound mass, and a roller carried by said cover-plate and adapted when said plate is in operative position with respect to said form to project into and across said channel.

9. In a winding machine, the combination with a rotary form having an annular strand-receiving channel, of means for directing a strand to said channel, said means including a strand-engaging guide element movable transversely of said channel so as to traverse the latter, means for operating said guide in timed relation with the rotary movement of said form, means in said channel for positively positioning the strand within the form, a cover-plate for said channel having an opening therethrough for passage to the channel of said strand, and mechanism for advancing and retracting said cover-plate to and from an operative position with respect to said form.

10. In a winding machine, the combination with a rotary form having an annular strand-receiving channel, of means for directing a strand to said channel, said means including a strand-engaging guide element movable transversely of said channel so as to traverse the latter, means for operating said guide in timed relation with the rotary movement of said form, means in said channel for positively positioning the strand within the form, a cover-plate for said channel having an opening therethrough for passage to the channel of said strand, and mechanism for advancing and retracting said cover-plate to and from an operative position with respect to said form, said mechanism comprising a weight exerting pressure tending to retract said plate and a fluid motor operating in opposition to said weight to advance said plate into operative position.

11. In a winding machine, the combination with a rotary form having an annular strand-receiving channel, of means for directing a strand to said channel, said means including a strand-engaging guide element movable transversely of said channel so as to traverse the latter, means for operating said guide in timed relation with the rotary movement of said form, means in said channel for positively positioning the strand within the form, a cover-plate for said channel having an opening therethrough for passage to the channel of said strand, mechanism for advancing and retracting said cover-plate to and from an operative position with respect to said form, and means actuated by retraction of said plate from the operative position for retracting said guide element from its normal operative position.

12. In a winding machine, the combination with a rotary head having a beveled forward face, of an axially aligned rotary flange movable axially with respect to said head and operative in an advanced position to provide with the latter a strand-receiving channel the bottom of which is formed by the said bevel face of the head, means for guiding a strand to said channel, said means including a strand-engaging guide element, means for reciprocating said guide element in timed relation with the rotary movement of said head and transversely of said channel so as to traverse the latter, and means operatively associated with said bevel surface for positively positioning the strand as it is directed to said surface by the said guide element.

13. In a winding machine, the combination with a rotary head having a beveled forward face, of an axially aligned rotary flange movable axially with respect to said head and operative in an advanced position to provide with the latter a strand-receiving channel the bottom of which is formed by the said bevel face of the head, means for guiding a strand to said channel, said means including a strand-engaging guide element, means for reciprocating said guide element in timed relation with the rotary movement of said head and transversely of said channel so as to traverse the latter, means operatively associated with said bevel surface for positively positioning the strand as it is directed to said surface by the said guide element, and mechanism for axially advancing and retracting said flange to and from the operative position with respect to said head, said means comprising a weight operative normally to retain the flange in the retracted position and fluid motor means for advancing said flange to the operative position against the pressure of said weight.

14. In a winding machine, the combination with a rotary head having a beveled forward face, of an axially aligned rotary flange movable axially with respect to said head and operative in an advanced position to provide with the latter a strand-receiving channel the bottom of which is formed by the said bevel face of the head, means for guiding a strand to said channel, said means including a strand-engaging guide element, means for reciprocating said guide element in timed relation with the rotary movement of said head and transversely of said channel so as to traverse the latter, means operatively associated with said bevel surface for positively positioning the strand as it is directed to said surface by the said guide element, mechanism for axially advancing and retracting said flange to and from the operative position with respect to said head, said means comprising a weight operative normally to retain the flange in the retracted position and fluid motor means for advancing said flange to the operative position against the pressure of said weight, a roller operative in said channel to confine the said strand to the said bevel surface of the head, and means for advancing and retracting said roller to and from an opertaive position with respect to said head, said means including a fluid motor operative to advance the roller to the said operative position, and control means common to both of said fluid motors.

15. In a winding machine, the combination with a rotary head, said head having a rearward relatively fixed portion and a forward portion relatively movable axially with respect to said rearward portion, said forward portion having a beveled forward face, a plurality of pins mounted in said forward portion and intersecting said bevel surface, the rearward ends of said pins being adapted to bear against the forward face of said relatively fixed rearward portion, springs exerting pressure to retract the pins in said forward portion and by pressure of the rearward ends of said pins against the said rearward portion of the head to advance the forward portion of the head axially to an extent effecting a retraction of the pins from the said bevel surface, a rotary flange mounted in axial alignment with said head and movable axially between an advanced position in engagement with said head and a retracted position removed from said head, said flange in the advanced position forming with the said beveled face of the head a strand-receiving channel, pressure means for advancing said flange into engagement with the forward portion of the head and for forcibly moving said forward portion axially against the pressure of said springs so as to effect a projection of said pins beyond the surface of said bevel surface, means for feeding a strand to said channel, said means including a strand-engaging guide element, and means for reciprocating said element so as to traverse said channel in timed relation with the rotary movement of said head.

16. In a winding machine, the combination with a rotary head having a beveled forward face, of an axially aligned rotary flange movable axially with respect to said head and operative in an advanced position to provide with the latter a strand-receiving channel the bottom of which is formed by the said bevel surface of the head, means for guiding a strand to said channel, said means including a strand-engaging guide element, means for reciprocating said guide element in timed relation with the rotary movement of said head and transversely of said channel so as to traverse the latter, means operatively associated with said bevel surface for positively positioning the strand as it is directed to said surface by the said guide element, mechanism for axially advancing and retracting said flange to and from the operative position with respect to said head, and means for clamping a leading end of said strand between said head and the flange.

RUSSELL HUTCHINSON.
CARL F. OGREN.
ARTHUR H. DURAGE.